(12) United States Patent
Jain et al.

(10) Patent No.: US 12,277,334 B2
(45) Date of Patent: Apr. 15, 2025

(54) SELECTABLE PERFORMANCE-BASED PARTITIONING

(71) Applicant: Sandisk Technologies, Inc., Milpitas, CA (US)

(72) Inventors: Nitin Jain, Bangalore (IN); Ronak Jain, Mysuru (IN); Matthew Klapman, San Jose, CA (US); Ramanathan Muthiah, Bangalore (IN); Taninder Singh Sijher, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/448,905

(22) Filed: Aug. 11, 2023

(65) Prior Publication Data

US 2024/0411469 A1 Dec. 12, 2024

Related U.S. Application Data

(60) Provisional application No. 63/472,511, filed on Jun. 12, 2023.

(51) Int. Cl.
*G06F 3/06* (2006.01)

(52) U.S. Cl.
CPC ............ *G06F 3/0644* (2013.01); *G06F 3/061* (2013.01); *G06F 3/0673* (2013.01)

(58) Field of Classification Search
CPC .... G06F 3/0608; G06F 3/0665; G06F 3/0619; G06F 3/0641; G06F 3/0689; G06F 16/1748; G06F 3/0631; G06F 12/0253; G06F 12/0261; G06F 2212/1044; G06F 3/064; G06F 3/0643; G06F 3/065; G06F 3/067; G06F 3/0673; G06F 12/0246; G06F 2212/7201; G06F 2212/7205; G06F 3/0484; G06F 3/04883; G06F 3/0604; G06F 3/0623; G06F 3/0644; G06F 3/0652; G06F 3/0659; G06F 3/0679; G06F 40/166

See application file for complete search history.

(56) References Cited

U.S. PATENT DOCUMENTS 8,478,963 B2 7/2013 Chang
10,871,919 B2 12/2020 Hong et al.
(Continued)

FOREIGN PATENT DOCUMENTS

CN 112506445 A 3/2021
EP 2712448 B1 4/2017

*Primary Examiner* — Yong J Choe
(74) *Attorney, Agent, or Firm* — PATTERSON + SHERIDAN, LLP

(57) ABSTRACT

A data storage device includes storage media and control circuitry and is configured to enable the creation of partitions with different performance levels. The storage media includes a first set and a second set of memory blocks having different performance levels. The control circuitry is configured to: in response to a request from a host system, provide performance data from the first set of memory blocks and the second set of memory blocks to the host system. The control circuitry is further configured to: receive partition settings from the host system, the partition settings creating a first partition including at least part of the first set of memory blocks and a second partition including at least part of the second set of memory blocks, wherein the first partition has a better performance level than the second partition; and save the partition settings to the storage media.

20 Claims, 8 Drawing Sheets

(56) References Cited

U.S. PATENT DOCUMENTS

| | | |
|---|---|---|
| 2011/0295810 A1 | 12/2011 | Xie et al. |
| 2014/0156915 A1 | 6/2014 | Borchers et al. |
| 2018/0232509 A1 | 8/2018 | Park et al. |
| 2021/0173577 A1 | 6/2021 | Kale |
| 2022/0100373 A1 | 3/2022 | Ke |

FIG. 2
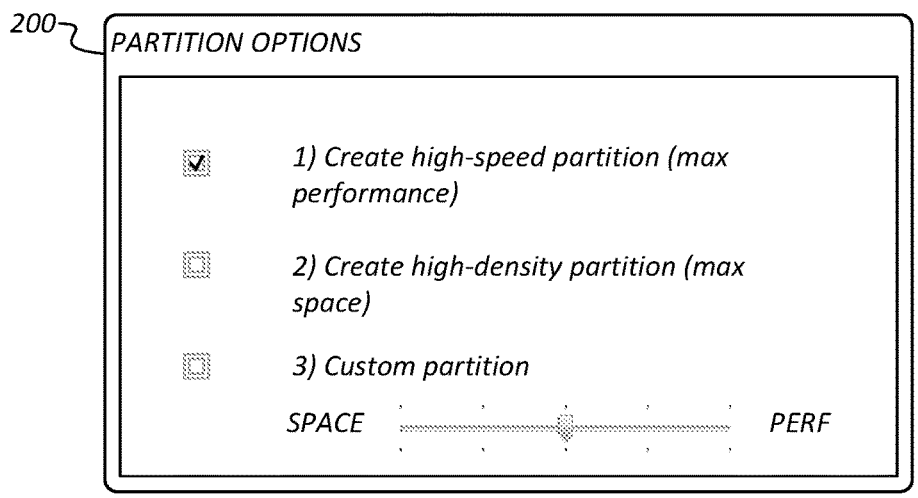
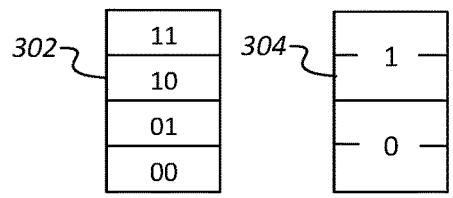
FIG. 3A
FIG. 3B
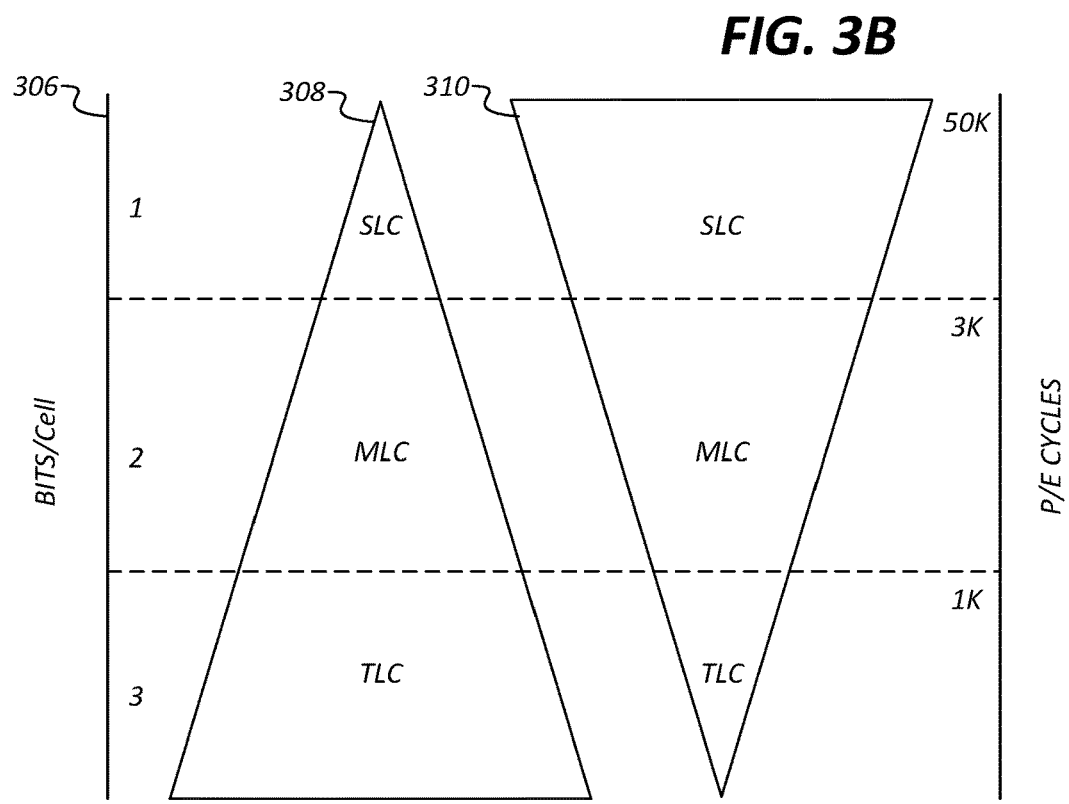

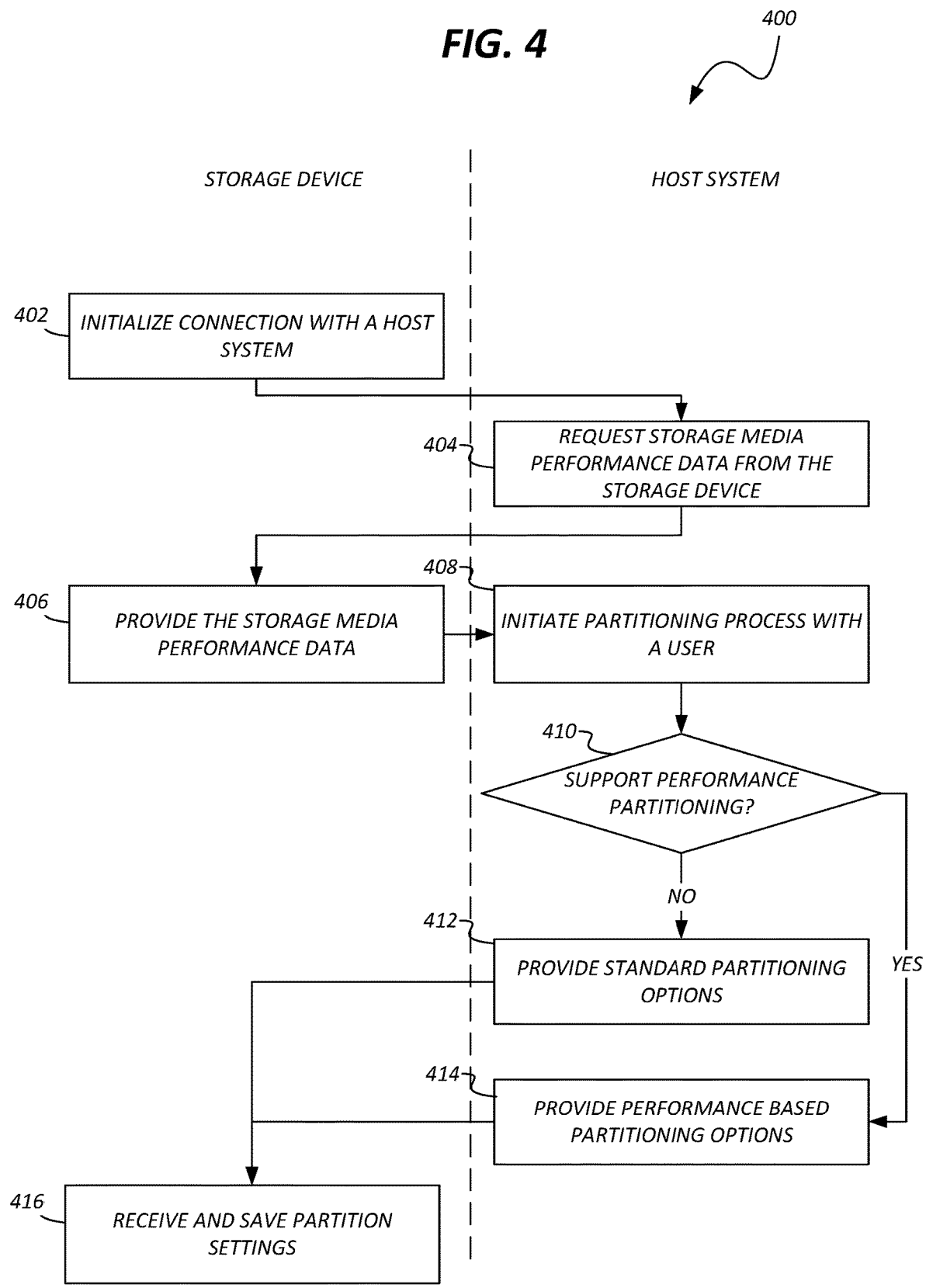

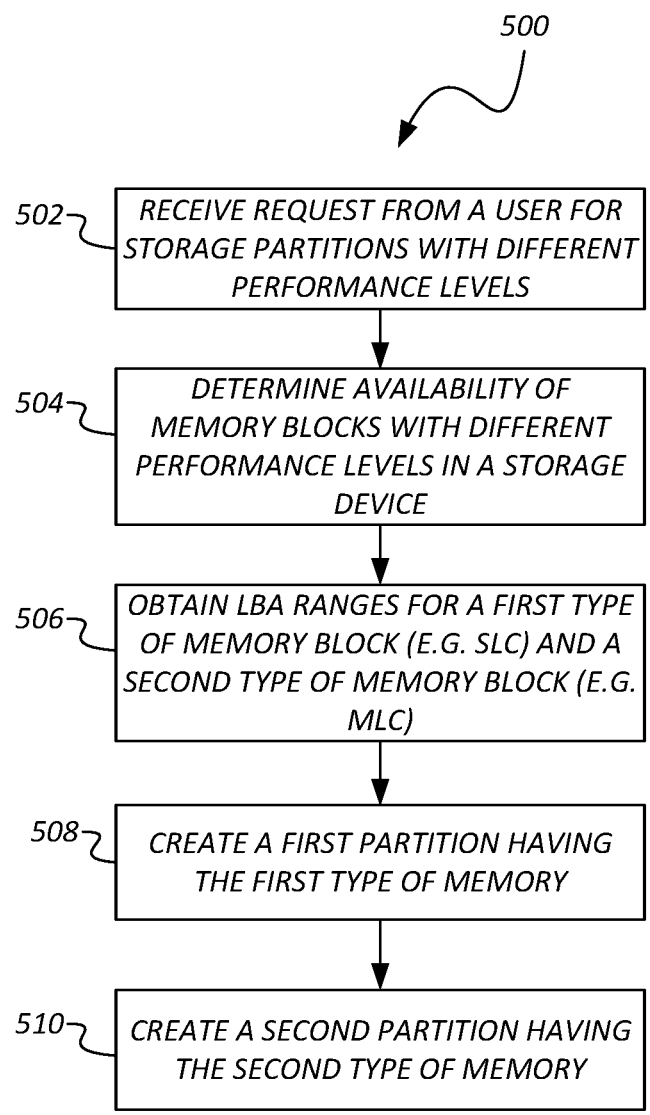

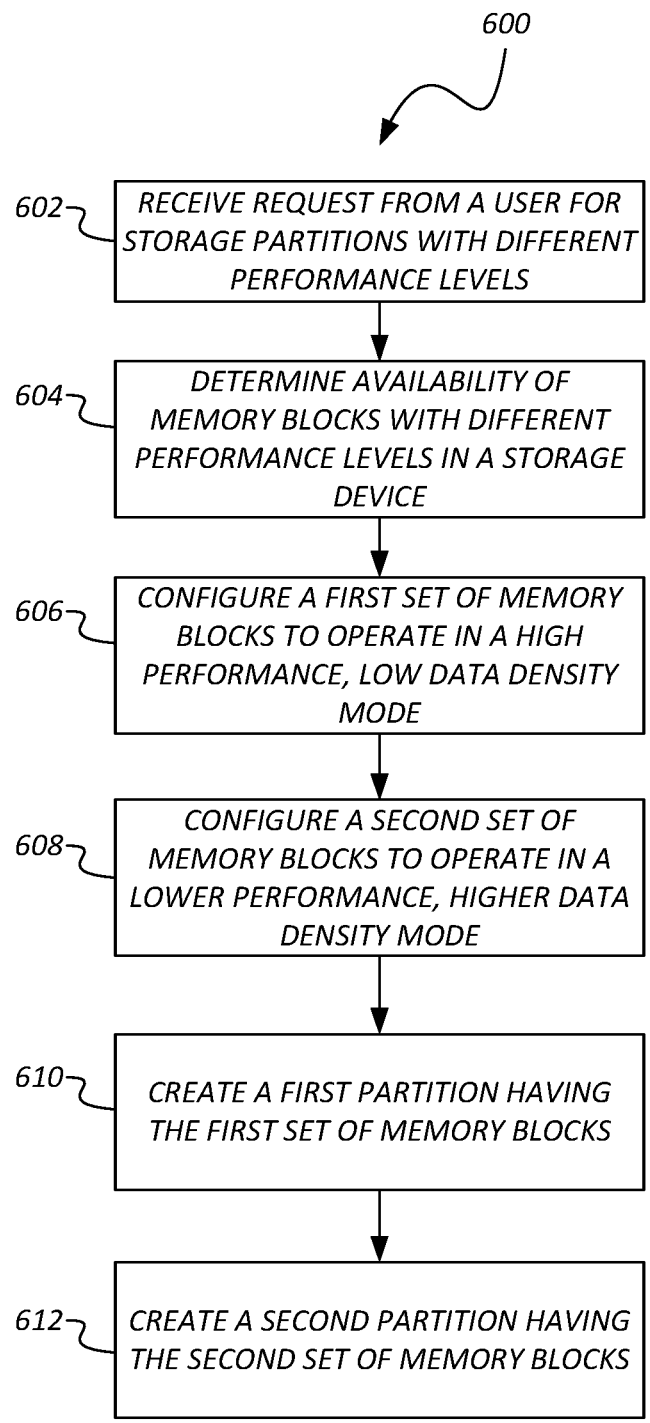

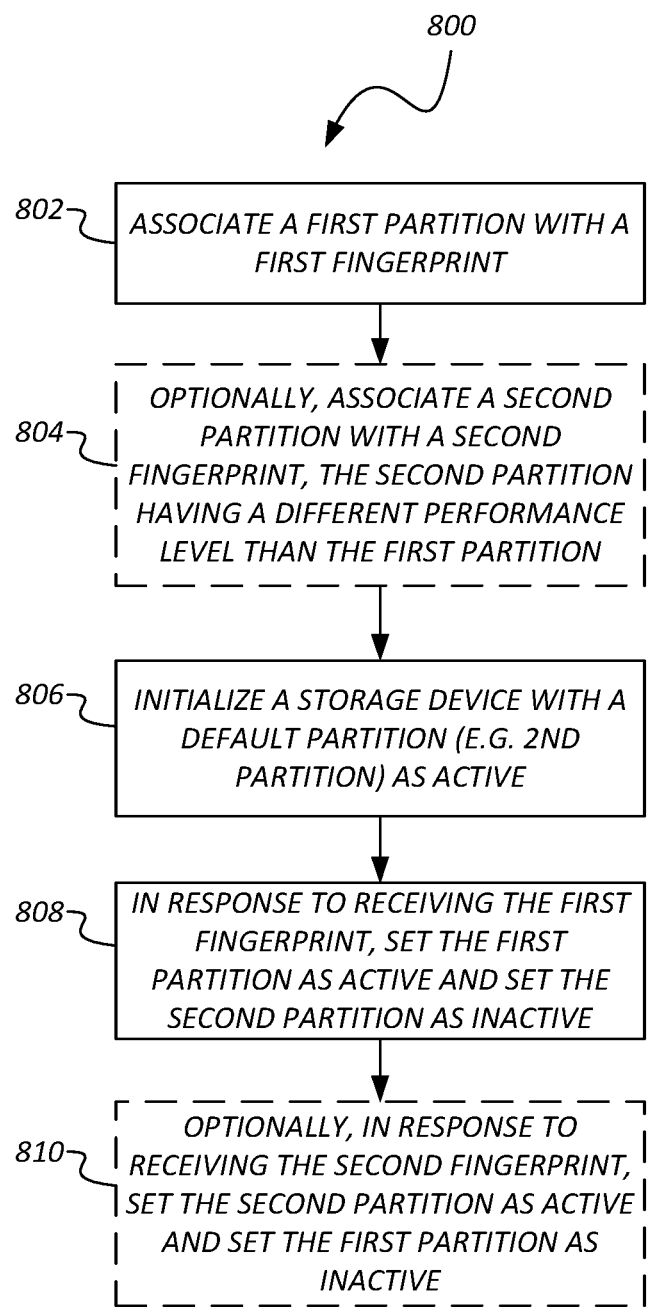

SELECTABLE PERFORMANCE-BASED PARTITIONING

CROSS-REFERENCE TO RELATED APPLICATIONS

The present application claims priority to U.S. Provisional Patent Application Ser. No. 63/472,511, filed Jun. 12, 2023, entitled SELECTABLE PERFORMANCE-BASED PARTITIONING, the disclosure of which is hereby incorporated by reference in its entirety.

BACKGROUND

Field

This disclosure relates to partitioning of storage devices. More particularly, the disclosure relates to devices and methods for configuring partitions on a storage device.

Description of Related Art

Disk partitioning is a technique used for organizing data on a data storage device. It enables for the separation of data into different categories or projects, and can be useful for setting up dual-boot systems or separating the operating system and programs from user data.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 2 illustrates a user interface screen for creating partitions with different performance levels that can be displayed by a partitioning tool, according to certain embodiments.

FIG. 3A illustrates a logical representation of a hybrid memory cell, according to certain embodiments.

FIG. 3B illustrates a chart representing the performance versus the capacity of various types of memory cells, according to certain embodiments.

FIG. 4 illustrates a block diagram representing a partitioning process performed between a host system and a data storage device 100, according to certain embodiments.

FIG. 5 illustrates a block diagram representing a partitioning process performed by the host system to create multiple partitions, according to certain embodiments.

FIG. 6 illustrates a block diagram representing a partitioning process performed by the host system to create multiple partitions using hybrid memory, according to certain embodiments.

FIG. 8 illustrates a block diagram representing a partition selection process performed by the data storage device 100 to set an active partition, according to certain embodiments.

DETAILED DESCRIPTION

Figure 1A:
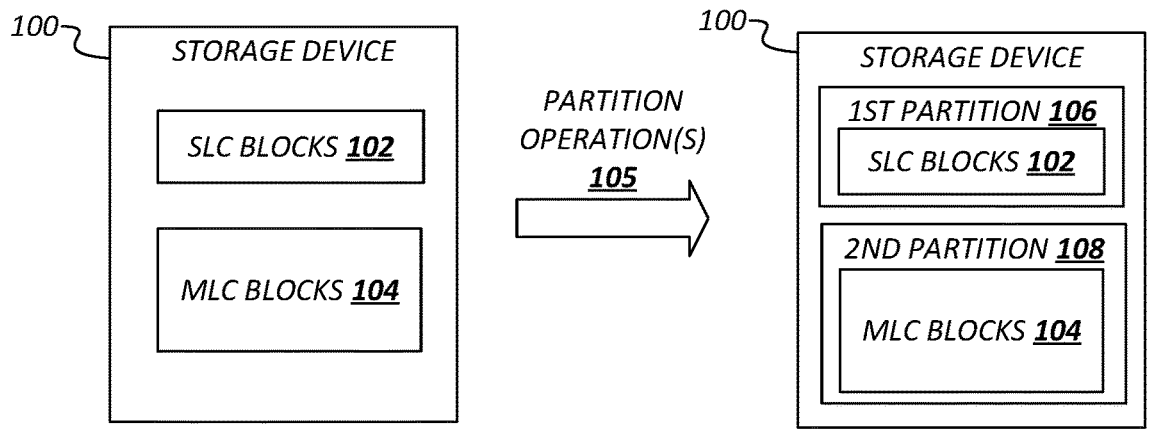
FIGS. 1A-1C are diagrams illustrating variations of a storage device that utilize memory cells that have different performance levels, according to certain embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Storage devices typically store various types of data, which may be accessed in different types of frequency. For example, some data may be cold data, such as archival data, that is accessed rarely. Some data can be hot data, such as caches or programs, that is accessed often. Due to the different use cases, different types of data can benefit from being stored on storage devices with different performance and cost profiles. For example, hot data may be placed in better performing storage devices, such as solid state drives (SSDs), while cold data may be placed in slower, cheaper storage devices, such as hard disk drives (HDDs) or tape drives.

While existing data centers already store data on different types of storage devices based on desired performance, it can be beneficial to enable individual users to create different partitions on a single storage device with different performance profiles based on the user's needs. In a home setting, a home computer may have just one or at most a few storage devices rather than the thousands in a data center. Thus, a home user does not typically have access to multiple storage devices with different performance levels and can therefore benefit from having different performing partitions in a single storage device. For example, application or operating system data can be stored in a faster partition, while media files, such as videos, pictures, or music, can be stored in a slower, but typically larger, partition.

The following systems and methods for disk partitioning includes a user interface that enables the user to select the storage drive to be partitioned, and specify the size and/or performance of each partition. The system can include a partition table that describes the layout of the disk and the location and size of each partition. The partition table is stored on the storage drive and is used by the operating system to manage the partitions.

The system can support various partitioning schemes, such as master boot record (MBR) and Globally Unique Identifier (GUID) Partition Table (GPT) partitioning schemes. In MBR partitioning, the hard drive is divided into four primary partitions or three primary partitions and an extended partition that can be divided into multiple logical partitions. GPT partitioning is designed to work with newer UEFI (Unified Extensible Firmware Interface) firmware and enables for larger disk capacities than MBR partitioning. In GPT partitioning, there is no limit to the number of partitions that can be created, and all partitions are considered primary. An Extensible Firmware Interface (EFI) partition, also known as an EFI System Partition (ESP), is a specific partition on a storage device that is used by the EFI firmware as a storage location for EFI-related files and data.

Once the partitions are created, the system enables the user to format each partition with a file system such as NT file system (NTFS) or File Allocation Table 32-bit (FAT32). The partition can then be used to store data independently of the other partitions on the same hard drive. Typically, each partition is provided, by the operating system, with its own drive letter or mount point, and can be accessed independently of the other partitions.

Various software tools, such as Disk Management in Windows or Disk Utility in macOS, can be used to create the partitions. Many of these tools are included with the operating system. These tools enable dividing the storage device into multiple logical partitions, each with its own file system. Typically, creating a partition in the storage device proceeds by selecting unallocated space on the drive and assigning it to a new partition. The user, through an interface provided by the partitioning tool, can specify the size of the partition, the file system to be used, and/or the partition label or name.

There are some differences in the partitioning process, depending on the type of storage device. For example, when partitioning SSDs compared to traditional hard drives, the SSDs can be over-provisioned. Over-provisioning is the practice of allocating more physical space on the SSD than the logical size of the drive. This extra space is used by the SSD controller for wear-leveling, garbage collection, and other maintenance tasks. Some SSDs come with pre-allocated over-provisioning, while others enable users to set the amount of over-provisioning during the partitioning process. For example, an SSD may be overprovisioned from 10-25%, though 15-20% is typical. Another consideration when partitioning an SSD is alignment. SSDs have a smaller sector size than traditional hard drives, and misalignment can cause performance issues. Most modern partitioning tools automatically align partitions correctly on SSDs.

In addition, in some embodiments, a partitioning tool can be configured to enable the user to select from specific memory blocks with different performance characteristics in the SSD. By creating a first partition with better performing memory blocks, the first partition can be created to have better performance than a second partition created with worse performing memory blocks. By selectively choosing the memory blocks included in the partition, the partition tool can select between performance and space, based on the desires of the user.

An SSD may have to use one or a combination of different memory blocks or cells. There are several types of NAND flash memory cells, each with different characteristics and performance capabilities. The most common types of NAND flash memory cells are Single-Level Cell (SLC), Multi-Level Cell (MLC), Triple-Level Cell (TLC), and Quad-Level Cell (QLC). Even denser variants may become available in the future. MLC can sometimes be used to refer specifically to two-level cells, but may also be used to refer generically to two or more level cells, such as TLC or QLC.

SLC is the simplest type of NAND flash memory cell, storing one bit of data per cell. SLC flash memory provides fast read and write speeds, low power consumption, and high endurance. However, it is also the most expensive type of NAND flash memory, due to its lower density and higher manufacturing costs.

MLC is a more complex type of NAND flash memory cell, storing two bits, or more, of data per cell. MLC flash memory offers higher density and lower manufacturing costs than SLC, but it also has lower endurance and slower write speeds. MLC flash memory is widely used in consumer electronics, such as digital cameras and USB drives.

TLC is a further development of MLC flash memory, storing three bits of data per cell. TLC flash memory provides even higher density and lower costs than two-level MLC, but it also has lower endurance and slower read and write speeds. TLC flash memory is commonly used in consumer devices, such as smartphones and tablets.

In addition to these main types of NAND flash memory cells, there are also newer types of memory cells, such as QLC and PLC (Penta-Level Cell). QLC flash memory stores four bits of data per cell, while PLC flash memory stores five bits of data per cell. These types of flash memory offer even higher density and lower costs than TLC, but they also have even lower endurance and slower read and write speeds.

Overall, the choice of NAND flash memory cell type to include in a partition can depend on the specific application for that partition. SLC cells are the most suitable for high-performance applications, while MLC, TLC and higher density cells are more appropriate for mass data storage.

The following describes devices and methods that enable the creation of partitions with specific performance characteristics. In one scenario, the storage device is configured to track and store the types of cells available in the storage device, along with their respective performance characteristics. When initialized during connection with a host system, the storage device provides drive capability data, including the available cell type and/or respective performance characteristics of the cells. The host system can then provide a user with the option to create partitions based on a desired performance level for the partition by the user. This enables the user to customize partitions by selecting performance appropriate to the type of data stored on that particular partition.

Storage Device

Figure 1B:
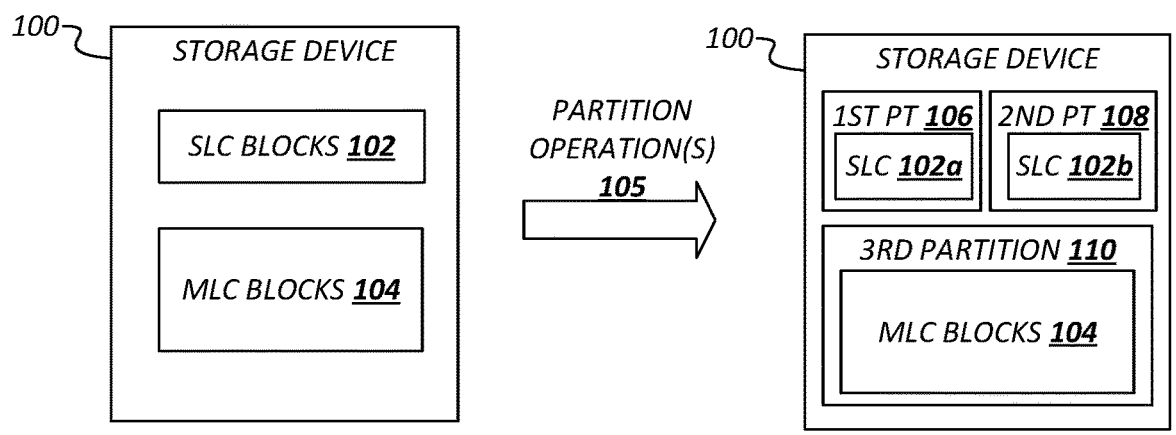
Figure 1C:
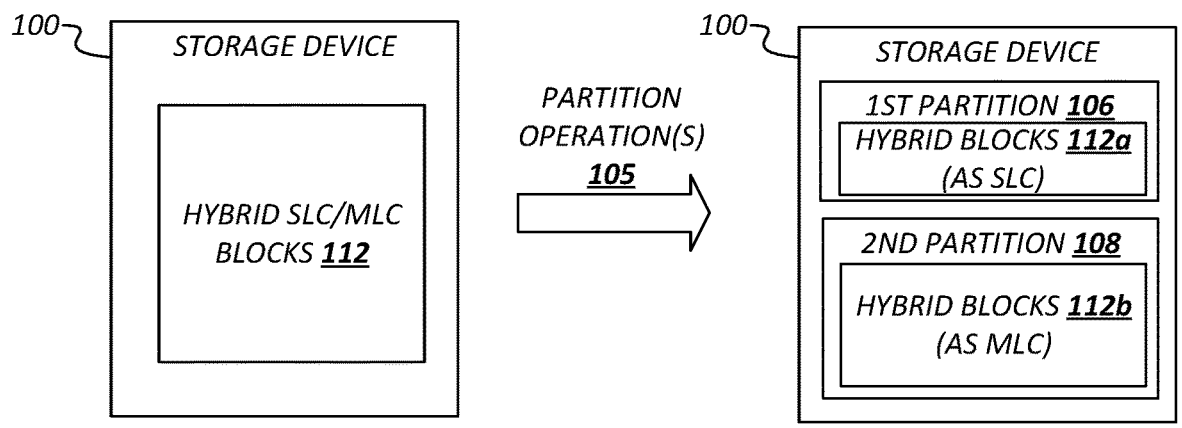

FIGS. 1A-1C are diagrams illustrating variations of a data storage device 100 that utilize memory cells that have different performance levels, according to certain embodiments. In FIG. 1A, the data storage device 100 includes SLC blocks 102 and MLC blocks 104. Partition operations 105 can be performed on the data storage device 100 that group the memory cells in various combinations. In one scenario, a first partition 106 is created that includes SLC blocks 102, while a second partition 108 is created with MLC blocks 104. In this scenario, the first partition 106 has better performance than the second partition 108.

The partitions may be created to have only one type of blocks or a combination of blocks. For example, the first partition 106 may include only SLC blocks 102 while the second partition 108 may include MLC blocks 104 and SLC blocks 102. By combining the two types of blocks in various rations, the second partition can generate different levels of performance. For example, by increasing the amount of SLC blocks 102, the write performance is increased, while by increasing the amount of MLC blocks 104, the maximum possible capacity is increased.

In FIG. 1B, the data storage device 100 again includes SLC blocks 102 and MLC blocks 104. Partition operations 105 can be performed on the data storage device 100 that group the memory cells in various combinations. In one scenario, a first partition 106 is created that includes SLC blocks 102a, a second partition 108 is created that includes SLC blocks 102b, and a third partition 110 is created with MLC blocks 104. The partitions may be created to have only one type of blocks or a combination of blocks. In this scenario, the first partition 106 and second partition 108 have about the same performance level, while the third partition 110 has a worse performance level (e.g., slower write and/or read speed).

In FIG. 1C, the data storage device 100 includes hybrid SLC/MLC blocks 112. Hybrid memory cells are a type of NAND flash memory cell that can work as both SLC and memory with 2+ levels. In this example, the hybrid memory cells work as SLC and MLC cells. These hybrid cells combines the benefits of SLC and MLC flash memory, providing a balance of performance, endurance, and cost.

In the example hybrid memory cell, the cell can be programmed to store either one bit of data (SLC) or two bits of data (MLC). The cell operates as SLC when storing a single bit of data and as MLC when storing two bits of data. This is achieved by using more precise voltage levels to distinguish between the two states.

The benefit of hybrid memory cells is that they can provide higher endurance and faster write speeds compared to standard MLC flash memory. SLC flash memory has higher endurance than MLC, but it is more expensive and has lower density. Hybrid memory cells can provide higher endurance than MLC by reducing the number of write cycles per cell when operating in SLC mode, while still providing a higher density than SLC.

Another benefit of hybrid memory cells is their ability to provide a balance between cost and performance. SLC flash memory provides the highest performance and endurance, but it is also the most expensive. MLC flash memory provides lower performance and endurance, but it is more cost-effective. Hybrid memory cells provide a balance between the two by providing higher performance and endurance than MLC, but at a lower cost than SLC.

Partition operations 105 can be performed on the data storage device 100 that group the hybrid blocks 112 in various combinations. In one scenario, a first partition 106 is created that includes hybrid blocks 112a in SLC mode and a second partition 108 that includes hybrid blocks 112b in MLC mode. The partitions may be created to have hybrid blocks 112 in only one mode or a combination of modes. In this scenario, the first partition 106 has better performance (e.g., faster write and/or read speed) than the second partition.

As will be apparent, different numbers of partitions can be created than the examples provided above. For example, more than three partitions can be created in the data storage device 100. In addition, the above methods and techniques can be utilized with other types of hybrid memory cells (e.g., TLC, QLC, PLC, etc.). As long as the data storage device 100 includes memory cells with different performance levels, a first partition can be created that performs better than a second partition by using primarily the higher performing memory cells.

FIG. 2 illustrates a user interface screen 200 for creating partitions with different performance levels that can be displayed by a partitioning tool that can be displayed by a partitioning tool, according to certain embodiments. In the illustrated embodiment, the user interface screen 200 provides options for a user to select partition options when formatting a data storage device 100. For example, the user may be given options to create a high-speed partition. The high-speed partition may be created by using only the fastest memory blocks (e.g., SLC) available on the data storage device 100. In some embodiments, this option can involve putting hybrid cells into SLC mode.

Another option that can be provided to the user is to create a high-density partition that maximizes space over performance. The high-density partition may be created by using only the densest memory (e.g., MLC, TLC, etc.) available on the data storage device 100. Typically, a data storage device 100 would have much more of the slower, cheaper memory cells than the faster, more expensive memory cells, thus the partitions that can be created using the slower memory cells would be larger. In some embodiments, this option can involve putting hybrid cells into MLC mode.

A third option that can be provide by the partitioning tool is create a custom partition, that enables a user to select a ratio between dense memory cells and high-performance memory cells. In the illustrated embodiment, a slider that can be moved between "SPACE" and "PERF" represents this selectable ratio. However, other types of interfaces can be used, such as a graphical icon, a numerical entry field, or the like. Sliding the slider towards "SPACE" increases the number of high-density cells, while sliding towards "PERF" increase the number of high performance cells. In some embodiments, the slider causes more hybrid memory cells to be put into MLC mode when prioritizing "SPACE" and more hybrid memory cells to be put into SLC mode when prioritizing "PERF." With more hybrid cells being placed in SLC mode, there is less space overall. As the hybrid cells in SLC mode store half the data than in MLC mode, the overall capacity of the data storage device 100 decreases.

FIG. 3A illustrates a logical representation of a hybrid memory cell, according to certain embodiments. In MLC mode 302, the hybrid memory cell can distinguish between two bits of data. The voltage level of the hybrid cell can be determined to be one of four different levels, representing either 00, 01, 10, or 11. In SLC mode 304, the hybrid memory cell is only used to track a single bit represented by two different voltage levels, corresponding to 0 or 1. Reading and writing to the hybrid memory cell by detecting and setting the voltage level does not need to be as precise, enabling the detecting and the setting of the voltage level to be performed faster. However, this benefit is obtained by reducing the overall amount of data that can be stored. Where the hybrid memory cell in MLC mode can store two bits of data, it takes two hybrid memory cells in SLC mode to store the same two bits of data.

As will be apparent, as technology develops, hybrid cells with greater capacities should become available. For example, hybrid cells may be able to operate in TLC mode (3 bits of data) or QLC mode (4 bits of data). These types of hybrid cells may also be used with the described partitioning methods and systems.

FIG. 3B illustrates a chart 306 representing the performance versus the capacity of various types of memory cells, according to certain embodiments. As shown by the triangle 308 on the left, SLC stores 1 bit per cell, two-level MLC stores 2 bits per cell, and TLC stores 3 bits per cell. For a desired storage capacity for a storage device, using SLC memory cells would be the most expensive, using MLC memory cells would be less expensive than using SLC, and using TLC memory cells would be even less expensive than MLC.

However, using denser memory typically comes at the costs of performance. As shown by inverted triangle 310, the denser memory generally has lower endurance, capable of lasting for lesser amounts of program/erase (P/E) cycles. A P/E cycle is an event in which data is written to a solid-state NAND flash memory cell and is subsequently erased and rewritten. For example, TLC may only be capable of surviving around 1000 P/E cycles, MLC may last about 3000 P/E cycles, while SLC may survive 50,000 P/E cycles. These values are representative values; actual values of specific types of memories can vary based on technology and manufacturer. Nevertheless, the denser memory cells tend to have a significant reduction in endurance. In addition, denser memory cells may also perform worse in terms of read and/or write performance than less dense cells (e.g., SLC).

FIG. 4 illustrates a block diagram representing a partitioning process 400 performed between a host system (as described in further detail in FIG. 9) and a data storage device 100, according to certain embodiments. For ease of reference, the following discusses the partitioning process in reference to the data storage device 100 of FIGS. 1A-1C, though it can work with other types of storage devices, such as HDDs or solid state hybrid drives (SSHDs). Furthermore, the process may be performed by the data storage device 100, host system or one of their components, such as the control circuitry or processor.

At block 402, the data storage device 100 initializes a connection with a host system. Prior to this, the data storage device 100 may be connected by the user to a data interface of the host system. The data interface may a universal serial bus (USB) port on the host system, physically connected indirectly by a USB cable or directly to another USB port on the data storage device 100. Other types of data interfaces can also be used, such as Lightning, Thunderbolt, external serial ATA (eSATA), or the like. In some examples, the data storage device 100 may be internal drive that is connected to an internal bus of the host system, such as nonvolatile memory express (NVMe), serial ATA (SATA), or the like. In these examples, the internal storage drive is installed within a chassis of the host system, connected to the data interface, and connected to a power source of the host system, as internal drives do not have an internal power source, such as a battery.

Initializing the connection may involve a handshake or other negotiation process. For example, USB devices utilize USB enumeration to establish a connection. USB enumeration is a process that takes place when a USB device is connected to a computer or other host system. Upon connection, the USB controller on the host system detects the device and establishes its power requirements. The controller then communicates with the device to determine its supported USB speed, such as USB 2.0 or USB 3.0. Next, the USB device provides its Vendor ID (VID) and Product ID (PID) to the host, which helps the operating system (OS) identify the device and locate the appropriate device drivers.

The OS then checks its driver database and either prompts the user for driver installation or automatically installs the necessary driver for the device. Such a driver may be configured to enable the partitioning process 400 to be performed by the host system. Once the driver is loaded, the host OS configures the USB device by assigning resources and determining its capabilities. Endpoint allocation can then take place, where the host OS assigns logical channels (endpoints) for data transfer based on the device's defined interfaces. The OS notifies relevant applications or services about the connected device, enabling them to interact with the device using the appropriate Application Programming Interface (API).

With the enumeration process complete, the USB device and the host computer are ready to exchange data through the allocated endpoints, utilizing the suitable USB protocols. USB enumeration ensures proper device identification, driver installation, and configuration, enabling effective communication and functionality between the USB device and the computer.

At block 404, the host system requests storage media performance data from the data storage device 100. The data can include the type of memory cells within the storage device, such as the number of SLC blocks and the number of TLC or QLC blocks. The data may also include read/write performance and/or endurance data for individual or groups of memory cells.

A storage device that does not support performance-based partitioning may not provide detailed performance data at the cell-level. Those types of storage devices may only provide data for the storage device as a whole, such as storage device capacity or drive read/write performance.

At block 406, the data storage device 100 provides the storage media performance data requested by the host system. The performance data provides the drive capabilities of the data storage device 100 to the host system. If supporting performance-based partitioning, the performance data includes cell-level performance data that at least identifies the types and amounts of different types of memory cells in the data storage device 100.

At block 408, the host system receives the storage media data and initiates a partitioning process with a user. For example, the OS of the host system can run a partitioning tool that opens a user interface prompt or screen that provides partitioning options to the user.

At block 410, the host system determines if the data storage device 100 supports performance partitioning, based at least partly on the storage media performance data. For example, the host system may check if cell-level performance data is available that identifies the types and amounts of different types of memory cells in the data storage device 100.

If the host system determines that the data storage device 100 does not support performance-based partitioning (NO path), the process proceeds to block 412. At block 412, the host system provides standard partitioning options to the user. Such options may include setting a size for the partition, but generally does not provide performance-based options, such as creating partitions of different performance levels. The host system can then send the partition selections, which can be made by the user or in some scenarios made automatically by the OS based on default settings, to the data storage device 100. The process 400 then proceeds to block 416.

If the host system determines that the data storage device 100 supports performance-based partitioning (YES path), the process proceeds to block 414. At block 414, the host system provides performance-based partitioning options to the user. Such options may include setting a size for the partition, setting a desired performance level (e.g., read/write and/or endurance) for the partition, or otherwise creating multiple partitions with different performance levels. Such varying performance in the partitions can be enabled by selecting which type of memory cells are included in the partition. For example, a first partition may include better performing, but costlier SLC memory blocks while the second partition may include worse performing, but cheaper and more plentiful MLC, TLC, or QLC blocks. The host system then sends the partition selections, which can be made by the user or in some scenarios made automatically by the OS based on default settings, to the data storage device 100. The process 400 then proceeds to block 416.

At block 416, the data storage device 100 receives and saves the partition settings. The partition settings may be saved in a specific location in the storage media, such as the MBR or GUID. The partitioning process 400 can then end.

FIG. 5 illustrates a block diagram representing a partitioning process 500 performed by the host system to create multiple partitions, according to certain embodiments. For ease of reference, the following discusses the partitioning process in reference to the host system, which may be a desktop computer, server, laptop, or other computing device that connects, internally or externally, to a data storage device 100. Furthermore, the process may be performed by the host system or one of its components, such as a processor or software running on that processor, such as an operating system and/or partitioning tool.

At block 502, the host system receives a request from a user to create storage partitions with different performance levels. The request may be received on a screen, window, or other input form, such as the user interface screen 200 described in FIG. 2. The user may request to create a first partition with a better performance level (e.g., read, write, endurance, or the like) than a second partition. The first partition may be smaller than the second partition. Typically, there are less of the faster memory blocks in a data storage device 100, so the available capacity for the faster partition is less than for the slower partition.

At block 504, the host system determines availability of memory blocks with different performance levels in the data storage device 100. The data storage device 100 can provide storage media performance data to the host system. The data storage device 100 can then determine whether there are memory cells with different performance levels that enable the creation of partitions with different performance levels. These memory cells may be different types of memory cells. Assuming these types of blocks exists, the process 500 proceeds to block 506.

At block 506, the host system obtains logical block address (LBA) ranges for a first type of memory block (e.g., SLC) and a second type of memory block (e.g., MLC, TLC, or QLC). LBA ranges in SSDs refer to the mapping of logical addresses to physical locations on the drive. LBA ranges are used to manage data storage and retrieval within the SSD.

In an SSD, the storage capacity is divided into numerous blocks, each containing a fixed number of pages. Each page typically holds a certain amount of user data, along with some additional information for error correction and management purposes. LBA ranges provide a way to map logical addresses, which are used by the host computer, to physical locations within the SSD. When the host system wants to read or write data to the SSD, it specifies the logical address, typically in the form of an LBA, to identify the location of the data within the file system.

The SSD's controller translates the logical address provided by the host into a physical address within the SSD's memory cells using the LBA ranges. The LBA range maps the logical addresses to the specific block and page addresses where the data is stored in the NAND flash memory.

The mapping process is dynamic and can change over time due to wear leveling and garbage collection mechanisms in the SSD. Wear leveling helps distribute write operations evenly across the memory cells to prevent excessive wear on any particular cell, while garbage collection handles the recycling of erased or invalid pages to free up space for new data.

The LBA range table, maintained by the SSD's controller, keeps track of the current mapping of LBAs to physical addresses. It enables efficient data access by ensuring that the host's requested data is correctly retrieved from the physical memory locations within the SSD.

By utilizing LBA ranges, SSDs provide a transparent interface to the host system, abstracting the physical location of the data and handling the necessary translation between logical and physical addresses. This enables the host to interact with the SSD using familiar file system operations while the SSD controller efficiently manages the underlying storage and data organization.

In some implementations, an LBA remapping table may be implemented on the data storage device 100 so that the host system sees a simpler and possibly linear set of LBAs for each partition. This can help abstract away the complexities of the data storage device's management firmware. The LBA remapping table may also be used to enable support for heterogenous drives, which are composed of different types of memories (NAND FLASH/HDD, etc.). Rather than dealing with LBA ranges from different types of memories, the LBA remapping table presents LBA ranges that map across those various types of memory.

At block 508, the host system creates a first partition having the first type of memory. The host system can select the LBA ranges of the desired types of memory to include in the first partition. In one scenario, the first type of memory is SLC memory, which is generally the fastest type of memory cell with the highest endurance found in an SSD. However, due to the cost of SLC cells, there is usually only a limited amount of SLC memory cells in an SSD.

SLC flash memory can be utilized as a cache in SSDs to improve performance and endurance. The SLC cache acts as a buffer between the host system and the main storage area, which is typically composed of MLC, TLC, or QLC flash memory.

When data is written to the SSD, it is initially stored in a high-speed SLC cache. This cache is smaller in size compared to the overall storage capacity of the SSD. Since SLC memory can handle fewer bits per cell compared to MLC or TLC, it provides faster write speeds, lower latency, and higher endurance. These properties make SLC suitable for caching frequently accessed or write-intensive data. The SLC cache can improve write performance by absorbing bursts of write operations into the faster SLC memory before moving them to the main storage area. It can also provide lower latency for frequently accessed data stored in the cache.

As the SLC cache fills up, a background process known as a flush operation is initiated. During this process, the data stored in the SLC cache is moved to the main storage area composed of MLC or TLC memory. This enables the SLC cache to be emptied and ready to receive new incoming data. The size of the SLC cache varies among SSD models, with some drives featuring larger caches for improved performance and endurance. The cache management algorithms within the SSD controller dynamically determine which data should be stored in the SLC cache based on usage patterns and access frequency.

However, in this partitioning process 500, the host system is enabled to allocate the SLC memory cells to a partition, instead of the SLC memory cells being only controlled by the SSD controller and used as a cache. By enabling the host system to allocate the SLC memory cells, higher performing partitions can be created.

At block 510, the host system creates a second partition having the second type of memory. In one scenario, the second type of memory can be one of MLC, TLC, QLC, or even denser memory types. Typically, there will be a lot more of this second type of memory in the data storage device 100 than the first type of faster, more expensive memory.

FIG. 6 illustrates a block diagram representing a partitioning process 600 performed by the host system to create multiple partitions using hybrid memory, according to certain embodiments. The process 600 of FIG. 6 is similar to the process of FIG. 5, but describes a storage device that uses hybrid memory cells. For ease of reference, the following discusses the partitioning process in reference to the host system, which may be a desktop computer, server, laptop, or other computing device that connects, internally or externally, to a data storage device 100. Furthermore, the process may be performed by the host system or one of its components, such as a processor or software running on that processor, which may be an operating system and/or partitioning tool.

At block 602, the host system receives a request from a user to create storage partitions with different performance levels. The request may be received on a screen, window, or other input form, such as the user interface screen 200 described in FIG. 2. The user may request to create a first partition with a better performance level (e.g., read, write, endurance, or the like) than a second partition. The first partition may be smaller than the second partition.

At block 604, the host system determines the availably of memory blocks with different performance levels in the data storage device 100. The data storage device 100 can provide storage media performance data to the host system. The data storage device 100 can then determine whether there are memory cells with different performance levels that enable the creation of partitions with different performance levels. These memory cells may be hybrid memory cells that can sacrifice capacity for better performance (e.g., SLC mode). Assuming these types of block exists, the process 600 proceeds to block 606.

Hybrid memory cells can perform in multiple modes. The hybrid memory cells may be MLC, SLC, or QLC cells that can function in SLC mode. For example, SLC mode for TLC memory can refer to a configuration in which TLC flash memory cells are operated in a SLC-like manner. TLC memory cells are typically designed to store three bits of data per cell, offering higher density and cost efficiency but sacrificing some performance and endurance compared to SLC or MLC memory.

In SLC mode for TLC memory, the controller treats the TLC cells as if they were SLC cells, effectively utilizing only a single bit of data storage capacity per cell. By doing so, the memory can achieve faster write speeds, lower latency, and increased endurance compared to conventional TLC operation at the cost lower data density.

In SLC mode, TLC cells are programmed with two voltage levels instead of the usual eight voltage levels used in traditional TLC mode. This simplifies the programming process and reduces the likelihood of errors during data storage and retrieval. As a result, the performance of the TLC memory is enhanced, resembling that of SLC memory cells. However, instead of storing three bits per cell, only one bit is stored, resulting in a lower storage capacity per memory cell.

At block 606, the host system configures a first set of memory blocks to operate in a high performance, low data density mode. For example, TLC memory may operate in SLC mode. Likewise, MLC memory or QLC memory can operate in SLC mode.

At block 608, the host system configures a second set of memory blocks to operate in a lower performance, higher data density mode. For example, TLC memory may operate in standard or TLC mode, storing three bits of data. Likewise, MLC memory may operate in standard or MLC mode, storing two bits of data. Similarly, QLC memory can operate in standard or QLC mode, storing four bits of data. As will be apparent, the above is not limited to these types memory cells and can apply to even higher density memory that store more than four bits of data.

At block 610, the host system creates a first partition having the first set of memory blocks. For example, the first partition may include only hybrid memory cells operating in SLC mode. In this scenario, the partition is maximizing performance. In other examples, the first partition may include a mix of hybrid cells operating in SLC mode and in standard mode. In this scenario, the partition is balancing increased performance while preserving more capacity. The ratio of hybrid cells in SLC mode versus standard mode can be selected depending on if the user prefers to prioritize performance or capacity.

At block 612, the host system creates a second partition having the set of memory blocks. For example, the second partition may include hybrid memory cells operating in standard mode. In order to maximize capacity, the second partition may be configured to include only hybrid memory cells operating in standard mode.

Figure 7A:
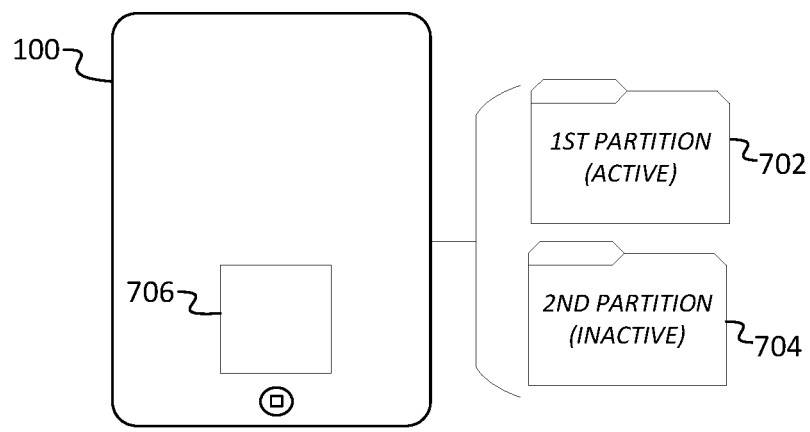
FIGS. 7A-7C are diagrams illustrating variations of the storage device that enable partition selection using fingerprints, according to certain embodiments.
Figure 7B:
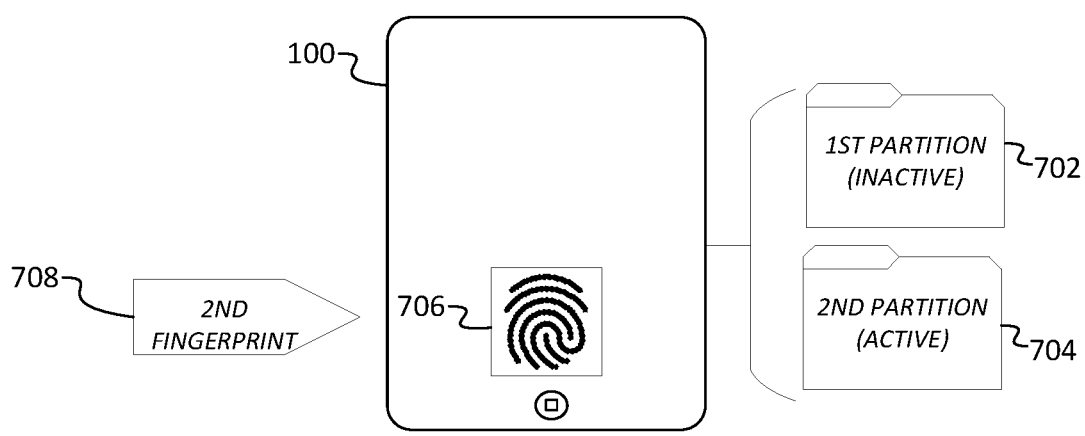
Figure 7C:
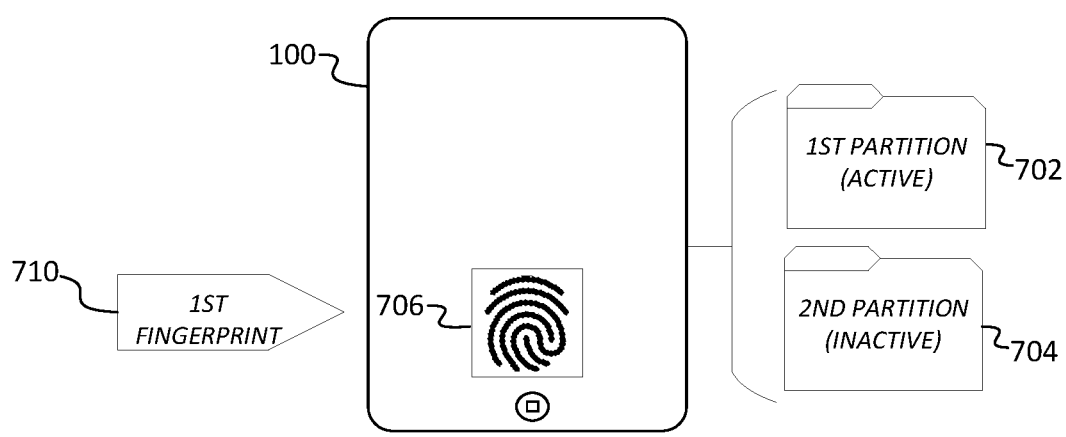

FIGS. 7A-7C are diagrams illustrating variations of the data storage device 100 that enable partition selection using fingerprints, according to certain embodiments. In some embodiments, the data storage device 100 includes a fingerprint sensor or scanner 706 for detecting fingerprints. The fingerprint sensor 706 may be formed on an external surface of an enclosure of the data storage device 100. For example, the data storage device 100 may be an external storage drive, with a display-less enclosure, with a data port (e.g., USB) and the fingerprint sensor 706 formed on outside of the enclosure.

Fingerprint scanners are biometric devices that capture and analyze the unique patterns on an individual's fingerprint to authenticate their identity. The scanner captures an image of the fingerprint using different techniques such as optical, capacitive, or ultrasonic methods. This image can then be processed to enhance its quality, correct distortions, and extract key features. Features like ridge endings, bifurcations, orientations, and minutiae can be extracted to create a mathematical representation called a fingerprint template.

The fingerprint template contains the unique characteristics of the fingerprint and serves as a reference for comparison. The template is stored securely, in the data storage device 100. This enables matching without storing the actual fingerprint image for privacy and security reasons. When a user attempts to authenticate, their fingerprint is scanned again, and a new template is created. This new template is then compared to the stored templates using matching algorithms.

During the matching process, the system compares the newly created template with the stored templates to find a match. Various factors, such as the level of similarity or dissimilarity, are considered to determine if the authentication is successful. If the match falls within a predefined threshold, the authentication is considered successful. However, if there is no significant match, the authentication is rejected, and access is denied.

In addition, the data storage device 100 has at least two partitions. As shown in FIG. 7A, the first partition 702 is active while the second partition 704 is inactive. An active partition is currently accessible, while the inactive partition is not accessible or otherwise readable. One of the partitions may be set as a default partition that is set to active if not user input that selects a partition has been received.

Furthermore, the data storage device 100 associates a second fingerprint 708 with the second partition 704 and a first fingerprint 710 with the first partition 702. As discussed above, templates can be stored on the data storage device 100 for each fingerprint.

In FIG. 7B, the data storage device 100 receives the second fingerprint 708 on the fingerprint scanner 706. The data storage device 100 determines the second fingerprint 708 matches a stored template of the second fingerprint and activates the associated partition, which in this case is the second partition 704. The first partition 702 may be set as inactive if only one active partition is desired at a time.

In FIG. 7C, the data storage device 100 receives the first fingerprint 710 on the fingerprint scanner 706. The data storage device 100 determines the first fingerprint 710 matches a stored template of the first fingerprint and activates the associated partition, which in this case is the first partition 702. The second partition 704 may be set as inactive if only one active partition is desired at a time.

FIG. 8 illustrates a block diagram representing a partition selection process performed by the data storage device 100 to set an active partition, according to certain embodiments. Furthermore, the process may be performed by the data storage device 100 or one of its components, such as control circuitry and/or firmware.

In block 802, the data storage device 100 associates a first partition with a first fingerprint. In one scenario, the first partition is configured to provide better performance, but a smaller capacity size. Such a partition may be useful for storing applications that are run by a host system. Associating the first fingerprint may involve storing a template or other identifier based on the first fingerprint and creating a link with the first partition. Such a link may be stored in a data store, flat file, firmware setting, or the like.

In block 804, the data storage device 100 may optionally associate a second partition with a second fingerprint, the second partition having a different performance level than the first partition. In one scenario, the second partition is configured to provide more capacity, at a slower performance level than the first partition. Such a partition may be useful for storing media files or other data that are not only sporadically used. Associating the second fingerprint may involve storing a template or other identifier based on the second fingerprint and creating a link with the second partition. Such a link may be stored in a data store, flat file, firmware setting, or the like.

In block 806, the data storage device 100 is connected to a host system and initializes with a default partition. The default partition may be set by the user or may be set by the firmware (e.g., defaults to first created partition). The user may then read or write data from the default partition as desired, using the host system. In this example scenario, the second partition is the default partition, though the process 800 can work with other partitions set as the default.

In block 808, in response to receiving the first fingerprint on a fingerprint scanner of the data storage device 100, the data storage device 100 sets the first partition, which was associated with the first fingerprint, as the active partition and the default partition (e.g., second partition) as inactive. The user may then read or write data from the first partition as desired, using the host system By setting a partition as inactive, the host system is unable to read or write to that partition. This can enable data separation, where data on one partition is unaffected by operations on data on the other partition. By enforcing data separation, the stored data can be more secure. For example, if a data virus infects files on the active partition, the data in the inactive partition would still be unaffected.

In block 810, optionally, in response to receiving the second fingerprint on the fingerprint scanner of the data storage device 100, the data storage device 100 sets the second partition, which was associated with the second fingerprint, as the active partition and the first partition as inactive. The user may then read or write data from the second partition as desired, using the host system.

Example Storage Device and Host System

Figure 9:
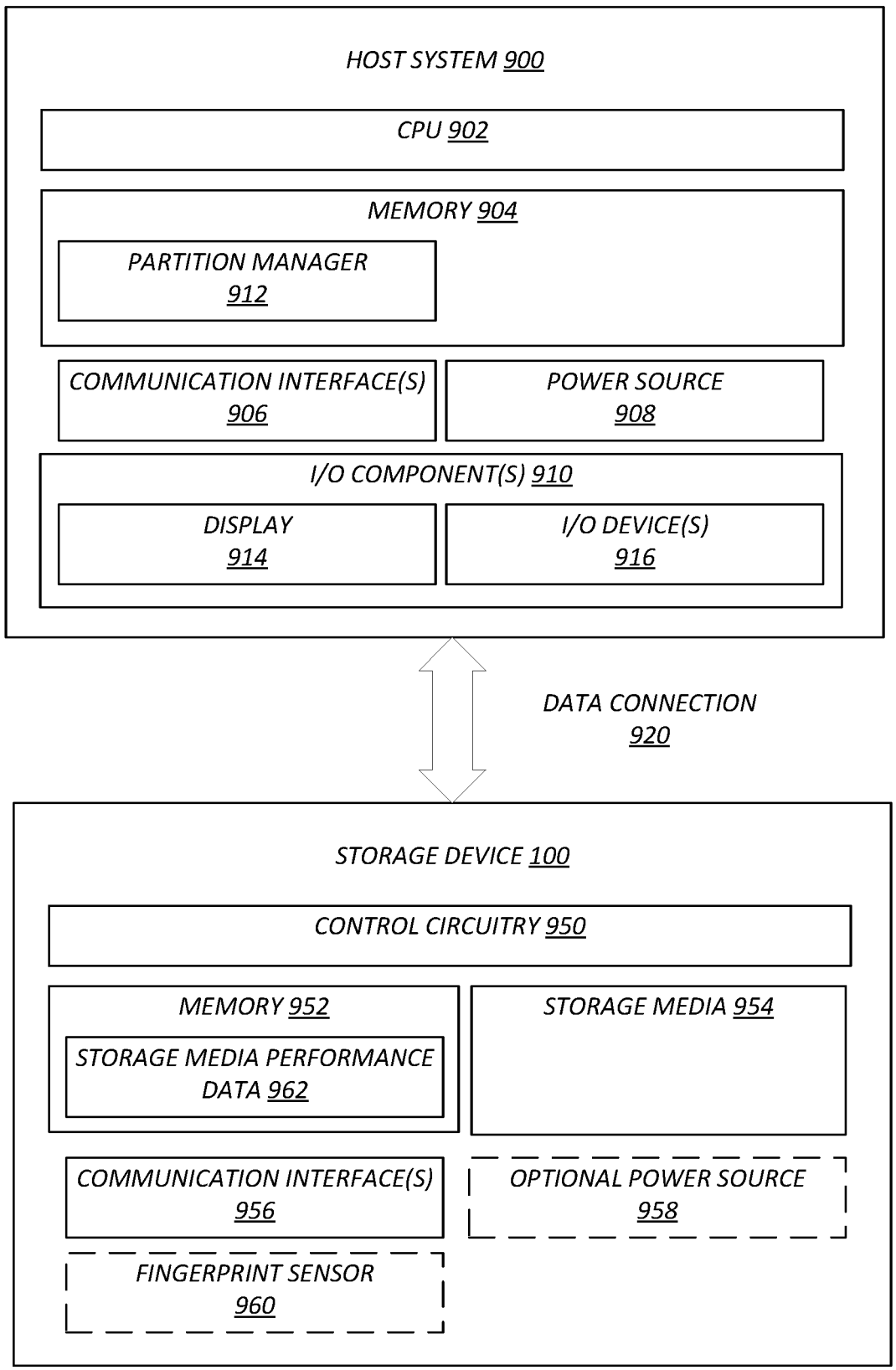
FIG. 9 illustrates example details of the storage device and a host system, according to certain embodiments.

FIG. 9 illustrates example details of the data storage device 100 and host system 900, according to certain embodiments. As illustrated, the host system 900 can include one or more of the following components, devices, modules, and/or units (referred to herein as "components"), either separately/individually and/or in combination/collectively: central processing unit (CPU) 902 or other type of processor, memory 904, communication interfaces 906, a power source 908 (e.g., battery or power supply unit), and/or one or more I/O components 910.

In some embodiments, the host system 900 can comprise a housing/enclosure configured and/or dimensioned to house or contain at least part of one or more of the components of the host system 900. In some embodiments, the data storage device 100 may be housed internally in the enclosure of the host system 900. For example, the host system 900 may be a server or desktop system in case or rack mount enclosure with one or more storage drives in the case or enclosure. The data storage device 100 may also be an external drive that is connected to the host system 900 via an external port, such as USB.

The memory 904 can employ a variety of storage technologies and/or form factors and can include various types of volatile memory, such as Random Access Memory (RAM). RAM is a type of computer memory that serves as a temporary storage area for data and instructions that are actively being used by a computer's operating system, applications, and processes. RAM is volatile memory, meaning that its contents are lost when the computer is powered off or restarted. RAM provides fast and temporary access to data, enabling the CPU 902 to quickly retrieve and manipulate the information it needs to perform tasks.

The memory 904 can include programs that are running on the host system 900, such as a partition manager 912 or other partitioning tool. The partition manager 912 may be a program configured to create partitions and provide a user interface for receiving user input. In addition, the host system 900 may also include non-volatile memory for permanently storing data. For example, the data storage device 100 may be an internal drive that is installed within the host system 900 housing or the host system 900 may include a separate storage drive different from the data storage device 100.

The one or more communication interfaces 906 can be a data interface that includes connectors, cables, and/or protocols for connection, communication, and/or power supply between host devices and the data storage device 100. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 100, such as male or female Type A, Type B, Type C, mini, and/or micro connectors. Other data interface standards can also be used, such as external SATA (eSATA), ExpressCard, FireWire (IEEE 1394), and Thunderbolt. The data interface can include a port for connecting with a cable and/or a corresponding port on the data storage device 100, forming a data connection 920 with the data storage device 100.

The power source 908 can be configured to provide/manage power for the host system 900. The power source 908 can comprise one or more devices and/or circuitry configured to provide a source of power and/or provide power management functionality. Moreover, in some embodiments the power source 908 includes a mains power connector that is configured to couple to an alternating current (AC) or direct current (DC) mains power source. In some embodiments, the power source can include one or more batteries, such as a lithium-based battery, a lead-acid battery, an alkaline battery, and/or another type of battery.

The one or more I/O components 910 can include a variety of components to receive input and/or provide output. The one or more I/O components 910 can be configured to receive touch, speech, gesture, biometric data, or any other type of input. In examples, the one or more I/O components 910 can be used to provide input regarding control of the host system 900, such as opening files, entering logins, plays, and/or changing settings. As shown, the one or more I/O components 910 can include the one or more displays 914 configured to display data and various user interfaces. The display 914 can include one or more liquid crystal displays (LCD), light-emitting diode (LED) displays, organic LED displays, plasma displays, electronic paper displays, and/or any other type(s) of technology. In some embodiments, the display 914 can include one or more touchscreens configured to receive input and/or display data. Further, the one or more I/O components 910 can include the one or more input/output devices 916, which can include a touchscreen, touch pad, controller, mouse, keyboard, wearable device (e.g., optical head-mounted display), virtual or augmented reality device (e.g., head-mounted display), etc.

As illustrated, the data storage device 100 can include one or more of the following components, devices, modules, and/or units (referred to herein as "components"), either separately/individually and/or in combination/collectively: control circuitry 950, memory 952, storage media 954, communication interfaces 956, optionally a power source 958 (e.g., battery or power supply unit), and/or optionally a fingerprint sensor 960. In some embodiments, the data storage device 100 can comprise a housing/enclosure configured and/or dimensioned to house or contain the components of the data storage device 100.

The data storage device 100 may be a solid-state drive (SSD), Secure Digital (SD) card, or a universal serial bus memory stick that uses semiconductor memory as the storage media. In other implementations, the data storage may be a hard disk drive that uses magnetic disks as the storage media or a solid-state hybrid drive that uses a combination of semiconductor memory and magnetic disk technology.

Although certain components of the data storage device 100 and host system 900 are illustrated in FIG. 9, it should be understood that additional components not shown can be included in embodiments in accordance with the present disclosure. Furthermore, certain of the illustrated components can be omitted in some embodiments. Although the control circuitry 950 is illustrated as a separate component, it should be understood that any or all of the remaining components of the data storage device 100 can be embodied at least in part in the control circuitry 950. That is, the control circuitry 950 can include various devices (active and/or passive), semiconductor materials and/or areas, layers, regions, and/or portions thereof, conductors, leads, vias, connections, and/or the like, wherein one or more of the other components of the data storage device 100 and/or portion(s) thereof can be formed and/or embodied at least in part in/by such circuitry components/devices.

The various components of the data storage device 100 can be electrically and/or communicatively coupled using certain connectivity circuitry/devices/features, which can or may not be part of the control circuitry 950. For example, the connectivity feature(s) can include one or more printed circuit boards configured to facilitate mounting and/or interconnectivity of at least some of the various components/circuitry of the data storage device 100. In some embodiments, two or more of the control circuitry 950, memory 952, the storage media 954, the communication interface(s) 956, the power source 958, and/or the fingerprint sensor 960, can be electrically and/or communicatively coupled to each other.

The storage media 954 can utilize various types of non-volatile memory (NVM) to permanently store data. NVM is a type of computer memory that can retain stored information even after power is removed. For example, the data storage/memory 904 can include one or more magnetic disks and/or semiconductor memory. The semiconductor memory can include any of various memory technologies, such as NAND memory and its variations like SLC, eMLC (Enterprise Multi Level Cell), MLC, TLC, and QLC. New types of emerging non-volatile memory could also be used such as Program in Place or Storage Class Memory (SCM) such as ReRam, Phase-Change Memory (PCM), and Magnetoresistive Random-Access Memory (MRAM).

As illustrated, the memory 952 can include storage media performance 962 data to facilitate various functionality discussed herein. Such data can include read/write performance for memory cells, estimated endurance for the memory cells, write counts for memory cells, types of memory cells, counts of each type of memory cell, and/or the like.

The one or more communication interfaces 956 can be configured to communicate with one or more device/sensors/systems. For example, the one or more communication interfaces 956 can send/receive data over a network. A network in accordance with embodiments of the present disclosure can include a local area network (LAN), wide area network (WAN) (e.g., the Internet), personal area network (PAN), body area network (BAN), etc.

The one or more communication interfaces 956 can be a data interface that includes connectors, cables, and/or protocols for connection, communication, and/or power supply between the host system 900 and the data storage device 100. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 100, such as male or female Type A, Type B, Type C, mini, and/or micro connectors. Other data interface standards can also be used, such as external SATA (eSATA), ExpressCard, FireWire (IEEE 1394), and Thunderbolt. The data interface can include a port for connecting with a cable and/or a corresponding port on the host system 900, forming the data connection 920.

The power source 958 can be configured to provide/manage power for the data storage device 100. In some embodiments, the power source can include one or more batteries, such as a lithium-based battery, a lead-acid battery, an alkaline battery, and/or another type of battery. In some embodiments the power source 958 includes a mains power connector that is configured to couple to an alternating current (AC) or direct current (DC) mains power source. However, in some embodiments, the data storage device 100 may not include an internal power source but be configured to receive power through the communication interface 956, such as via a USB connection.

The term "control circuitry" is used herein according to its broad and ordinary meaning, and can refer to any collection of one or more processors, processing circuitry, processing modules/units, chips, dies (e.g., semiconductor dies including come or more active and/or passive devices and/or connectivity circuitry), microprocessors, micro-controllers, digital signal processors, microcomputers, central processing units, graphics processing units, field programmable gate arrays, programmable logic devices, state machines (e.g., hardware state machines), logic circuitry, analog circuitry, digital circuitry, and/or any device that manipulates signals (analog and/or digital) based on hard coding of the circuitry and/or operational instructions. Control circuitry can further comprise one or more storage devices, which can be embodied in a single memory device, a plurality of memory devices, and/or embedded circuitry of a device. Such data storage can comprise read-only memory, random access memory, volatile memory, non-volatile memory, static memory, dynamic memory, flash memory, cache memory, data storage registers, and/or any device that stores digital information. It should be noted that in embodiments in which control circuitry comprises a hardware state machine (and/or implements a software state machine), analog circuitry, digital circuitry, and/or logic circuitry, data storage device(s)/register(s) storing any associated operational instructions can be embedded within, or external to, the circuitry comprising the state machine, analog circuitry, digital circuitry, and/or logic circuitry.

The term "memory" is used herein according to its broad and ordinary meaning and can refer to any suitable or desirable type of computer-readable media. For example, computer-readable media can include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other types of data.

Computer-readable media that can be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As used in certain contexts herein, computer-readable media may not generally include communication media, such as modulated data signals and carrier waves. As such, computer-readable media should generally be understood to refer to non-transitory media.

Additional Embodiments

Those skilled in the art will appreciate that in some embodiments, other types of storage devices can be implemented while remaining within the scope of the present disclosure. In addition, the actual steps taken in the processes discussed herein may differ from those described or shown in the figures. Depending on the embodiment, certain of the steps described above may be removed, others may be added, and the order may be rearranged.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage device comprising:
   storage media comprising a first set of memory blocks having a first performance level and a second set of memory blocks having a second performance level, the first performance level being better than the second performance level; and
   control circuitry configured to:
      in response to a request from a host system, provide performance data from the first set of memory blocks and the second set of memory blocks to the host system;
      receive partition settings from the host system, the partition settings creating a first partition including at least part of the first set of memory blocks and a second partition including at least part of the second set of memory blocks, wherein the first partition has a better performance level than the second partition, wherein performance level is read speed, write speed, or endurance;
      save the partition settings to the storage media; and then
      creating the first partition and the second partition.

2. The data storage device of claim 1, the data storage device further comprising a communication port configured to be to be physically connected to the host system.

3. The data storage device of claim 2, wherein the communication port comprises a universal serial bus (USB) port that is further configured to provide power to the data storage device.

4. The data storage device of claim 2, the data storage device further comprising a fingerprint sensor formed on an external surface of an enclosure of the data storage device.

5. The data storage device of claim 4, the control circuitry further configured to:
receive a fingerprint on the fingerprint sensor;
determine that the fingerprint is associated with the first partition; and
set the first partition as an active partition.

6. The data storage device of claim 5, the control circuitry further configured to set the second partition as an inactive partition.

7. The data storage device of claim 5, the control circuitry further configured to:
receive a second fingerprint on the fingerprint sensor;
determine that the second fingerprint is associated with the second partition;
set the second partition as the active partition; and
set the first partition as an inactive partition.

8. The data storage device of claim 1, wherein:
the first performance level of the first set of memory blocks comprises faster write speed in comparison to the second performance level of the second set of memory blocks; and
the first partition has a faster write speed than the second partition.

9. The data storage device of claim 8, wherein the first partition is smaller than the second partition.

10. The data storage device of claim 1, wherein the partition settings are saved to a master boot record (MBR) or an Extensible Firmware Interface (EFI) system partition on the data storage device.

11. The data storage device of claim 1, wherein the first set of memory blocks comprises single-level cells (SLC) and the second set of memory blocks comprises multi-level cells (MLC).

12. The data storage device of claim 1, wherein the first set of memory blocks comprises hybrid memory operating in single-level cell mode and the second set of memory blocks comprises hybrid memory operating in multi-level cell mode.

13. A host system comprising:
a communication interface configured to communicate data to a data storage device;
a display interface configured to provide user interface data; and
a processor configured to:
request performance data from the data storage device, the performance data identifying a first set of memory blocks having a first performance level and a second set of memory blocks having a second performance level, the first performance level being better than the second performance level, wherein performance level is read speed, write speed, or endurance;
provide a selection interface, via the display interface, to a user to create partitions with different performance levels;
receive a request from the user for a first partition having a first performance level and a second partition having a second performance level, wherein the first partition has a better performance level than the second partition;
generate partition settings for the data storage device, the partition settings defining a first partition including at least part of the first set of memory blocks and a second partition including at least part of the second set of memory blocks;
provide the partition settings to the data storage device; and then
request the data storage device to create the first partition and the second partition.

14. The host system of claim 13, the host system further comprising the data storage device.

15. The host system of claim 13, wherein the communication interface comprises a universal serial bus (USB) port that is configured to connect to the data storage device.

16. The host system of claim 15, wherein the data storage device comprises a fingerprint scanner formed on an external surface of an enclosure of the data storage device.

17. The host system of claim 13, wherein:
the first performance level of the first set of memory blocks comprises faster write speed in comparison to the second performance level of the second set of memory blocks; and
the first partition has a faster write speed than the second partition.

18. The host system of claim 17, wherein the first partition is smaller than the second partition.

19. A data storage device comprising:
storage media comprising a first set of memory blocks having a first performance level and a second set of memory blocks having a second performance level, the first performance level being better than the second performance level, wherein performance level is read speed, write speed, or endurance;
means for providing performance data from the first set of memory blocks and the second set of memory blocks to a host system;
means for saving partition settings received from the host system, the partition settings creating a first partition including at least part of the first set of memory blocks and a second partition including at least part of the second set of memory blocks, wherein the first partition has a better performance level than the second partition; and
means for creating the first partition and the second partition in response to receiving the partition settings from the host system.

20. The data storage device of claim 19, the data storage device further comprising a fingerprint sensor, the data storage device further configured to:
receive a fingerprint on the fingerprint sensor;
determine that the fingerprint is associated with the first partition; and
set the first partition as an active partition.

* * * * *